United States Patent
Chen et al.

(10) Patent No.: US 10,102,612 B2
(45) Date of Patent: Oct. 16, 2018

(54) ROTATING AN OBJECT ON A SCREEN

(75) Inventors: Njin-Zu Chen, Eindhoven (NL);
Dennis Omer Logghe, Ichtegem (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 66 days.

(21) Appl. No.: 14/111,293

(22) PCT Filed: May 2, 2012

(86) PCT No.: PCT/IB2012/052186
§ 371 (c)(1),
(2), (4) Date: Oct. 11, 2013

(87) PCT Pub. No.: WO2012/153233
PCT Pub. Date: Nov. 15, 2012

(65) Prior Publication Data
US 2014/0062870 A1    Mar. 6, 2014

(30) Foreign Application Priority Data

May 9, 2011 (EP) .................................. 11165263

(51) Int. Cl.
*G06F 3/0481* (2013.01)
*G06F 3/0484* (2013.01)
(Continued)

(52) U.S. Cl.
CPC ............... *G06T 3/60* (2013.01); *G06F 3/017* (2013.01); *G06F 3/0488* (2013.01);
(Continued)

(58) Field of Classification Search
CPC .... G06F 3/017; G06F 1/1626; G06F 3/04815; G06F 3/04845; G06F 3/0488; G06T 19/20; G06T 19/2016; G06T 3/60
(Continued)

(56) References Cited

U.S. PATENT DOCUMENTS

| | | | |
|---|---|---|---|
| 5,687,307 A | 11/1997 | Akisada et al. | |
| 8,619,023 B2 * | 12/2013 | Park | G06F 3/0346 345/156 |

(Continued)

FOREIGN PATENT DOCUMENTS

| | | |
|---|---|---|
| CN | 1462929 A | 12/2003 |
| CN | 101198925 A | 6/2008 |

(Continued)

OTHER PUBLICATIONS

Song et al, "A Handle Bar Metaphor for Virtual Object Manipulation With Mid-Air Interaction", Conference Proceedings—The 30th ACM Conference on Human Factors in Computing Systems, 2012, pp. 1297-1306.

(Continued)

*Primary Examiner* — Antonio Xavier

(57) ABSTRACT

An apparatus (1) for rotating objects (40) on screens (9) defines a hand axis (20) in response to 3D position information related to the hands (21, 22) of a user and detects a changed orientation of the hand axis (20) with respect to a 3D space and calculates a rotation for the object (40) on the screen (9) in response to said detecting. This way, to rotate the object (40) on the screen (9), an imaginary copy of the object (40) is considered to be inside an imaginary ball (41) held by the user, which imaginary ball (41) is being rotated. The changed orientation of the hand axis (20) comprises changes in angles between the hand axis (20) and the axes (31, 32, 33) of the 3D space. To improve stability in case of each one of said changes being unequal to zero, the apparatus (1) further detects the angles and compares the respective angles with respective thresholds and reduces or weights the respective changes in response to respective comparison results.

19 Claims, 2 Drawing Sheets

(51) Int. Cl.
*G06F 3/01* (2006.01)
*G06T 3/60* (2006.01)
*G06F 3/0488* (2013.01)
*G06T 19/20* (2011.01)

(52) U.S. Cl.
CPC ...... *G06F 3/04815* (2013.01); *G06F 3/04845* (2013.01); *G06T 19/20* (2013.01); *G06T 2219/2016* (2013.01)

(58) Field of Classification Search
USPC .................................................. 345/65, 419
See application file for complete search history.

(56) References Cited

U.S. PATENT DOCUMENTS

| | | | |
|---|---|---|---|
| 2006/0129070 A1* | 6/2006 | Pearl | A61B 5/0057 600/595 |
| 2008/0125224 A1 | 5/2008 | Pollatsek | |
| 2009/0021475 A1 | 1/2009 | Steinle et al. | |
| 2009/0092227 A1 | 4/2009 | David et al. | |
| 2009/0228841 A1 | 9/2009 | Hildreth | |
| 2009/0231278 A1* | 9/2009 | St. Hilaire | G06F 3/017 345/158 |
| 2009/0262074 A1 | 10/2009 | Nasiri et al. | |
| 2009/0262187 A1 | 10/2009 | Asada | |
| 2009/0303204 A1 | 12/2009 | Nasiri | |
| 2010/0280988 A1 | 11/2010 | Underkoffler et al. | |
| 2011/0059798 A1* | 3/2011 | Pryor | G06F 3/042 463/37 |
| 2011/0157231 A1* | 6/2011 | Ye et al. | 345/649 |
| 2011/0193939 A1* | 8/2011 | Vassigh | G06F 3/011 348/46 |
| 2011/0289456 A1* | 11/2011 | Reville | G06F 3/017 715/830 |
| 2012/0056878 A1* | 3/2012 | Miyazawa | G06F 1/1626 345/419 |
| 2012/0262574 A1* | 10/2012 | Park | G06F 3/017 348/143 |

FOREIGN PATENT DOCUMENTS

| | | |
|---|---|---|
| CN | 101257851 A | 9/2008 |
| EP | 1717677 A2 | 11/2006 |
| JP | 07239750 A | 9/1995 |
| JP | 2012507802 A | 3/2012 |
| WO | 2006020305 A2 | 2/2005 |

OTHER PUBLICATIONS

Cutler et al, "Two Handed Direct Manipulation on the Responsive Workbench", Proceedings of 1997 Symposium on Interactive 3D Graphics, Apr. 27-30, 1997, pp. 107-114.

Bolt et al, "Two-Handed Gesture in Multi-Modal Natural Dialog", UIST, Monterey, CA, 1992, pp. 7-14.

Billinghurst, "Gesture Based Interaction", Haptic Input, May 27, 2009, Chapter 14, pp. 14.1-14.35.

Wachs et al, "Real-Time Hand Gesture Interface for Browsing Medical Images", IC-MED, vol. 2, No. 1, 2008, pp. 1-11.

Funahasahi et al, "A Study of Object Manipulation With Both Hands in Virtual Spaces", The Institute of Electronics, Information and Communication Engineers, Technical Report, MVE96-71, 1997, pp. 21-28.

Hiraike et al, "Virtual Tools for Three-Dimensional Objects Manipulation", NEC Corporation, 1992, pp. 87-90.

* cited by examiner

ROTATING AN OBJECT ON A SCREEN

CROSS-REFERENCE TO PRIOR APPLICATIONS

This application is the U.S. National Phase application under U.S.C. § 371 of International Application No. PCT/2012/052186, filed May 2, 2012, which claims the benefit of European Patent Application No. 11165263.2, filed May 9, 2011. These applications are hereby incorporated by reference herein.

FIELD OF THE INVENTION

The invention relates to an apparatus for rotating an object on a screen. The invention further relates to a device, a method for rotating an object on a screen, a computer program product, and a medium.

Examples of such an apparatus are gesture based image manipulating devices, for example in a medical field where a doctor needs to remain sterile, or for example in a control field where a controller is performing control in front of one or more screens, or for example in a creative field where an art director is being creative in front of one or more screens.

BACKGROUND OF THE INVENTION

US 2009/0021475 A1 discloses a method for displaying and/or processing image data of medical origin using gesture recognition. This method is relatively complex.

SUMMARY OF THE INVENTION

It is an object of the invention to provide a relatively simple apparatus. Further objects of the invention are to provide a device, a relatively simple method, a computer program product and a medium.

According to a first aspect, an apparatus is provided for rotating an object on a screen, the apparatus comprising
a definition unit for in response to first 3D position information related to a first hand of a user and in response to second 3D position information related to a second hand of the user defining a hand axis,
a detection unit for detecting a changed orientation of the hand axis with respect to an axis of a 3D space, and
a calculation unit for in response to a detection result from the detection unit calculating a rotation for the object on the screen.

The definition unit receives the first 3D (three-dimensional) position information related to the first hand of the user and the second 3D position information related to the second hand of the user from a position measurement system such as a 3D camera or two 2D (two-dimensional) cameras or global positioning system detectors or local positioning system detectors or detectors for detecting disturbances in electromagnetic fields or detectors based on radar or sonar technology etc. In response to the first and second 3D position information, the definition unit defines a hand axis. This hand axis for example passes the centers of the hands or passes particular finger tips of the hands or passes items held by the hands etc. as indicated by the 3D position information.

The detection unit detects the changed orientation of the hand axis with respect to one or more axes of the 3D space, and the calculation unit calculates the rotation for the object on the screen in response to the detection result from the detection unit. As a result, by having introduced the hand axis, a relatively simple apparatus has been created. Such a relatively simple apparatus is for example faster, cheaper, more robust, more reliable and more fail safe.

The hand axis may be used for more purposes, such as zooming. A longer hand axis may correspond with zooming out, a shorter hand axis may correspond with zooming in, or vice versa An embodiment of the apparatus is defined by the changed orientation of the hand axis comprising a first change in a first angle between the hand axis and a first axis of the 3D space and a second change in a second angle between the hand axis and a second axis of the 3D space and a third change in a third angle between the hand axis and a third axis of the 3D space. Once the hand axis has been defined, it is advantageous to define the changed orientation of the hand axis in terms of changes in the angles between the hand axis and each axis of the 3D space.

An embodiment of the apparatus is defined by each one of the first and second and third changes being unequal to zero. In this case the user is performing or has performed 3D rotation.

An embodiment of the apparatus is defined by the detection unit comprising an angle detector for detecting the first and second and third angles and comprising a comparator for comparing the respective first and second and third angles with respective first and second and third thresholds and comprising a reducer for in response to respective first and second and third comparison results reducing one or more of the respective first and second and third changes. In case the first (second, third) angle is equal to or smaller than the first (second, third) threshold, the first (second, third) change may be reduced to improve stability.

An embodiment of the apparatus is defined by one of the first and second and third comparison results indicating the corresponding angle being equal to or smaller than the corresponding threshold, and the reducer reducing the corresponding change towards zero.

An embodiment of the apparatus is defined by one of the first and second and third comparison results indicating the corresponding angle being equal to or smaller than the corresponding threshold, and the reducer weighting the corresponding change. A weighting factor will here usually be between 0% and 100%.

An embodiment of the apparatus is defined by two of the first and second and third comparison results indicating the corresponding angles being equal to or smaller than the corresponding thresholds, and the reducer weighting the corresponding changes. Each weighting factor will here usually be between 0% and 100%.

An embodiment of the apparatus is defined by one or two of the first and second and third changes being unequal to zero. In this case the user is performing or has performed a 1D (one-dimensional) or 2D rotation.

An embodiment of the apparatus is defined by each one of the first and second and third changes being a change per time-interval. Most position measurement systems will provide position information per time-interval or per frame or a change over time.

An embodiment of the apparatus is defined by the first axis of the 3D space being a X-axis and the second axis of the 3D space being a Y-axis and the third axis of the 3D space being a Z-axis. Usually, the X-axis and the Y-axis are the substantially horizontal and substantially vertical axes parallel to a front of the position measurement system and the Z-axis is the axis substantially perpendicular to this front of the position measurement system, but any other axes system could be used.

An embodiment of the apparatus is defined by the first 3D position information related to the first hand of the user comprising a first absolute or relative 3D coordinate and the second 3D position information related to the second hand of the user comprising a second absolute or relative 3D coordinate and the hand axis passing both 3D coordinates.

According to a second aspect, a device is provided comprising the apparatus and further comprising a position measurement system for providing the first and second position information and/or the screen.

According to a third aspect, a method is provided for rotating an object on a screen, the method comprising a step of defining a hand axis in response to first 3D position information related to a first hand of a user and in response to second 3D position information related to a second hand of the user, a step of detecting a changed orientation of the hand axis with respect to an axis of a 3D space, and a step of calculating a rotation for the object on the screen in response to a detection result.

According to a fourth aspect, a computer program product is provided for performing the steps of the method.

According to a fifth aspect, a medium is provided for storing and comprising the computer program product.

Embodiments of the method correspond with the embodiments of the apparatus.

An insight could be that to rotate an object on a screen an imaginary copy of the object could be considered to be inside an imaginary ball held by a user, which imaginary ball is to be rotated. A basic idea could be that a hand axis between the hands of the user is to be defined, a changed orientation of the hand axis is to be detected and in response a rotation for the object on the screen is to be calculated.

A problem to provide a relatively simple apparatus has been solved. A further advantage could be that such a relatively simple apparatus is for example faster, cheaper, more robust, more reliable and more fail safe.

These and other aspects of the invention will be apparent from and elucidated with reference to the embodiments described hereinafter.

DETAILED DESCRIPTION OF EMBODIMENTS

Figure 1:
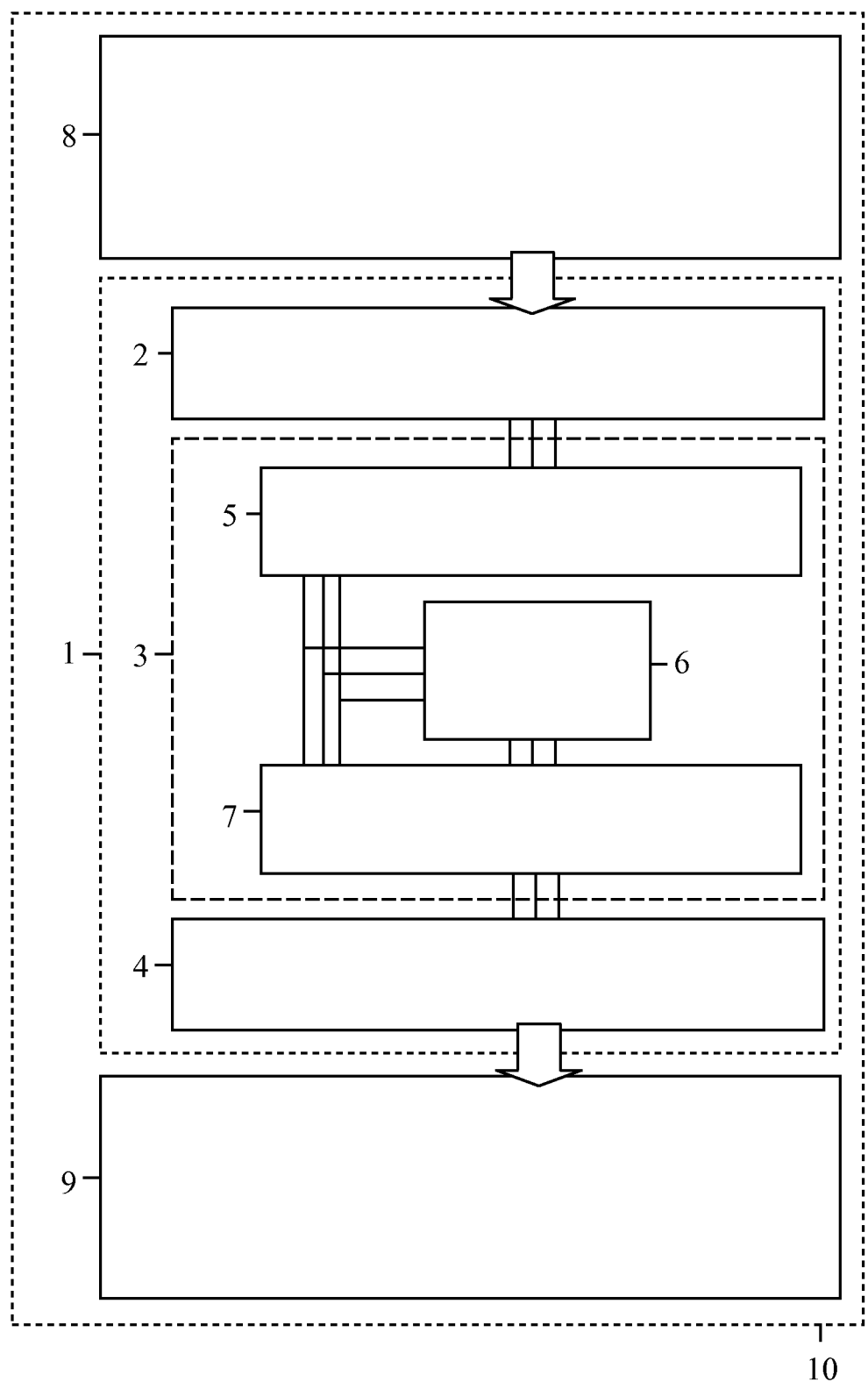
FIG. 1 shows a device comprising an apparatus.

In the FIG. 1, a device is shown comprising an apparatus. The device 10 comprises a position measurement system 8 for providing first 3D (three-dimensional) position information related to a first hand of a user and second 3D position information related to a second hand of the user, an apparatus 1 and a screen 9. The apparatus 1 for rotating an object on the screen 9 comprises a definition unit 2 for in response to the first 3D position information and in response to the second 3D position information defining a hand axis. The apparatus 1 further comprises a detection unit 3 for detecting a changed orientation of the hand axis with respect to an axis of a 3D space and a calculation unit 4 for in response to a detection result from the detection unit 3 calculating a rotation for the object shown on the screen 9.

The position measurement system 8 may comprise a 3D camera or two 2D (two-dimensional) cameras or global positioning system detectors or local positioning system detectors or detectors for detecting disturbances in electromagnetic fields or detectors based on radar or sonar technology etc. The apparatus 1 may comprise any kind of defining/detecting/calculating system such as one or more processors and/or one or more computers etc. The screen 9 may comprise any kind of screen, such as a display or a projector or a conventional television etc.

Figure 2:
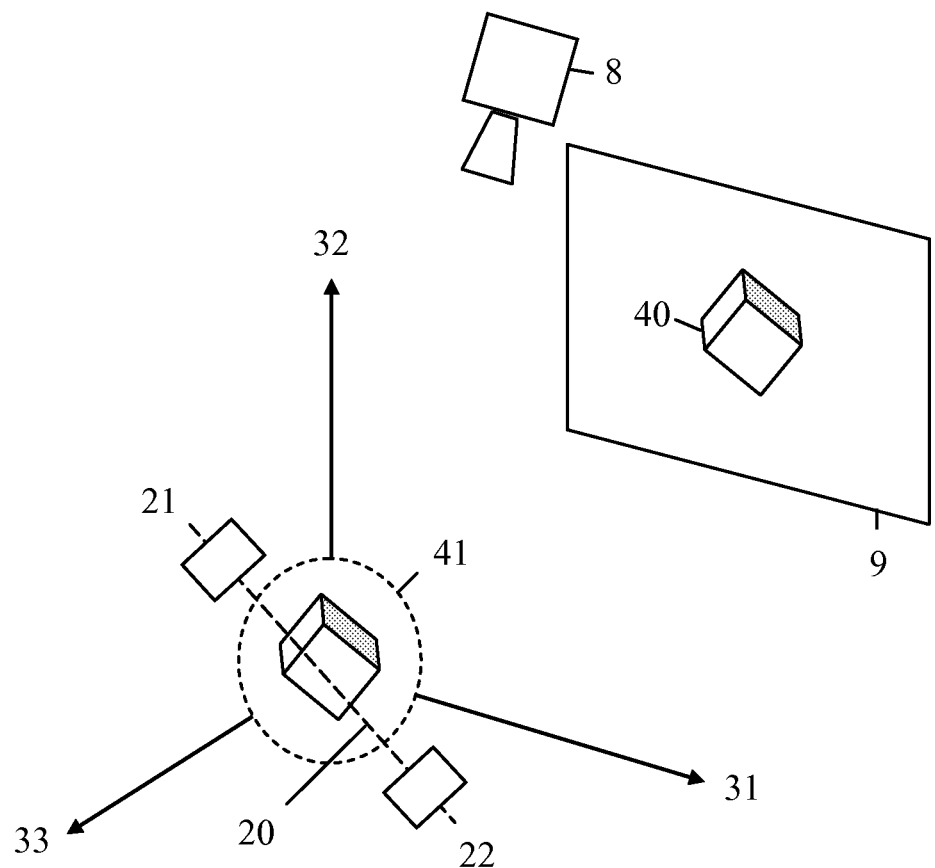
FIG. 2 shows a hand axis between two hands in a 3D space.

In the FIG. 2, a hand axis between two hands is shown in a 3D space. The hand axis 20 between a first hand 21 and a second hand 22 of the user makes a first angle with a first axis 31 of the 3D space such as for example a X-axis and makes a second angle with a second axis 32 of the 3D space such as for example a Y-axis and makes a third angle a third axis 33 of the 3D space such as for example a Z-axis. Further shown in the FIG. 2 are the screen 9 showing the object 40 and the position measurement system 8 here in the form of a 3D camera. The hands 21 and 22 are virtually holding an imaginary ball 41 that comprises an imaginary copy of the object 40 shown on the screen 9. When the user moves his hands 21 and 22 to rotate the imaginary ball 41 in the 3D space for one or more degrees, the hand axis 20 will get a changed orientation (resulting from the rotation for one or more degrees) and one or more of the first and second and third angles will change. Instead of the imaginary ball 41, any other shaped item could be used. This hand axis 20 for example passes the centers of the hands 21-22 or passes particular finger tips of the hands 21-22 or passes items held by the hands 21-22 etc. as indicated by the 3D position information.

Preferably, the changed orientation of the hand axis 20 may comprise a first change in the first angle between the hand axis 20 and the first axis 31 of the 3D space and a second change in the second angle between the hand axis 20 and the second axis 32 of the 3D space and a third change in the third angle between the hand axis 20 and the third axis 33 of the 3D space.

In case the user is performing or has performed a 3D rotation, each one of the first and second and third changes will be unequal to zero. In that case, under certain circumstances, the 3D rotation might sometimes become unstable, whereby for example a relatively small change in an angle between the hand axis 20 and one of the first and second and third axes 31 and 32 and 33 of the 3D space may result in a relatively large change on the screen 9. To solve this problem, as shown in the FIG. 1, the detection unit 3 may be provided with an angle detector 5 for detecting the first and second and third angles and with a comparator 6 for comparing the respective first and second and third angles with respective first and second and third thresholds and with a reducer 7 for in response to respective first and second and third comparison results reducing one or more of the respective first and second and third changes.

For example in case one of the first and second and third comparison results is indicating that the corresponding angle is equal to or smaller than the corresponding threshold, the reducer 7 may reduce the corresponding change towards zero. This case corresponds to disabling a particular one of the first and second and third axes 31 and 32 and 33 of the 3D space and corresponds to ignoring angle changes between the hand axis 20 and this particular one axis of the 3D space.

For example in case one of the first and second and third comparison results is indicating that the corresponding angle is equal to or smaller than the corresponding threshold, the reducer 7 may weight the corresponding change. This case corresponds to reducing the influence from a particular one of the first and second and third axes 31 and 32 and 33 of the 3D space and corresponds to reducing angle changes between the hand axis 20 and this particular one axis of the 3D space. An amount of weighting and an amount of reduction may depend on a size of the corresponding angle or not. The corresponding threshold may have a constant value or may depend upon a rotation speed, a stability of the user, an experience of the user, a size of another angle, another threshold and further features etc. Similarly, said weighting may depend upon this kind of features etc.

For example in case two of the first and second and third comparison results are indicating that the corresponding angles are equal to or smaller than the corresponding thresholds, the reducer 7 may weight the corresponding changes. This case corresponds to reducing the influence from two particular axes of the first and second and third axes 31 and 32 and 33 of the 3D space and corresponds to reducing angle changes between the hand axis 20 and these two particular axes of the 3D space. An amount of weighting and an amount of reduction may depend on sizes of the corresponding angles or not. The corresponding thresholds may have constant values or may depend upon rotation speeds, a stability of the user, an experience of the user, a size of another angle, another threshold and further features etc. Similarly, said weighting may depend upon this kind of features etc.

In case the user is performing or has performed a 1D (one-dimensional) or 2D rotation, one or two of the first and second and third changes will be unequal to zero. In that case, usually the 1D or 2D rotation will not become unstable.

Preferably, each one of the first and second and third changes may be a change per time-interval. Most position measurement systems 8 will provide position information per time-interval or per frame or a change over time.

Preferably, the first 3D position information related to the first hand 21 of the user may comprise a first absolute or relative 3D coordinate and the second 3D position information related to the second hand 22 of the user may comprise a second absolute or relative 3D coordinate and the hand axis 20 may pass both 3D coordinates.

Summarizing, an apparatus 1 for rotating objects 40 on screens 9 defines a hand axis 20 in response to 3D position information related to the hands 21, 22 of a user and detects a changed orientation of the hand axis 20 with respect to a 3D space and calculates a rotation for the object 40 on the screen 9 in response to said detecting. This way, to rotate the object 40 on the screen 9, an imaginary copy of the object 40 is considered to be inside an imaginary ball 41 held by the user, which imaginary ball 41 is being rotated. The changed orientation of the hand axis 20 comprises changes in angles between the hand axis 20 and the axes 31, 32, 33 of the 3D space. To improve stability in case of each one of said changes being unequal to zero, the apparatus 1 further detects the angles and compares the respective angles with respective thresholds and reduces or weights the respective changes in response to respective comparison results.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for rotating an object on a screen, the apparatus comprising:
a hand axis determiner configured to:
determine an orientation of a hand axis between respective points of a first hand and a second hand in a 3D space in a real world environment, based on first position information from a sensor related to the first hand and based on second position information from the sensor related to the second hand,
a hand axis change determiner configured to:
determine a change in the orientation of the hand axis with respect to an axis of the 3D space in the real world environment, and
a rotation calculator configured to:
calculate a rotation of the object on a screen in response to the change in orientation of the hand axis, wherein said calculated rotation comprises:
determine a size of the change in orientation of the hand axis with respect to at least one axis of the 3D space;
determine whether the determined size of the change in orientation of the hand axis is less than a corresponding threshold value associated with at least one axis of the 3D space, and
when the determined size of the change in orientation is less than a corresponding threshold value associated with at least one axis of the 3D space, determine a size of a processed change orientation of the hand axis, wherein the size of the processed change orientation represents a weighted reduction of the size of the change in orientation with respect to said associated at least one axis, said weighting being based on the size of the change in orientation and greater than zero (0) percent; and
orient the object based on the calculated rotation.

2. The apparatus as defined in claim 1, the change in the orientation of the hand axis comprising:
a first change in a first angle between the hand axis and a first axis of the 3D space;
a second change in a second angle between the hand axis and a second axis of the 3D space; and
a third change in a third angle between the hand axis and a third axis of the 3D space.

3. The apparatus as defined in claim 2, wherein each of the first and second and third changes being unequal to zero.

4. The apparatus as defined in claim 2, the hand axis change determiner comprising:
an angle detector configured to detect the first angle, the second angle and the third angle;
a comparator configured to compare the first, second and third angles with respective first threshold, second threshold and third threshold;
a reducer configured to:
alter at least one of the first angle, the second angle, and the third angle in response to respective first, second, and third comparison results, wherein the alteration reduces a corresponding one of the first change, the second change and the third change; and
determine the processed changed orientation based on at least one of the reduced first change, the reduced second change and the reduced third change.

5. The apparatus as defined in claim 4, one of the first, the second and the third comparison results indicating a corresponding angle being equal to or smaller than a corresponding one of the first threshold, the second threshold and the third threshold, and the reducer reducing the corresponding change towards zero.

6. The apparatus as defined in claim 4, one of the first, the second and the third comparison results indicating a corresponding angle being equal to or smaller than a corresponding one of the first threshold, the second threshold and the third threshold, and the reducer weighting the corresponding change.

7. The apparatus as defined in claim 4, wherein two of the first, the second and the third comparison results indicating corresponding angles being equal to or smaller than a corresponding one of the first threshold, the second threshold and the third threshold, and the reducer weighting the corresponding changes.

8. The apparatus as defined in claim 2, wherein at least one of the first, the second and the third changes being unequal to zero.

9. The apparatus as defined in claim 2, each one of the first, the second and the third changes being a change per time-interval.

10. The apparatus as defined in claim 2, the first axis of the 3D space being an X-axis, the second axis of the 3D space being a Y-axis and the third axis of the 3D space being a Z-axis.

11. The apparatus as defined in claim 1, wherein the first position information related to the first hand of the user comprising one of: a first absolute and a relative coordinate and the second position information related to the second hand of the user comprising one of: a second absolute and a relative coordinate and the hand axis passing both coordinates.

12. A device comprising:
an apparatus comprising:
a hand axis determiner configured to determine the orientation of a hand axis between respective points at a first hand and a second hand in a 3D space, in response to a first position information related to the first hand in the 3D space and in response to a second position information related to the second hand in the 3D space,
a hand axis detector configured to detect a changed orientation of the hand axis with respect to at least one axis of within the 3D space; and a rotation calculator configured to:
calculate a rotation in response to the changed orientation, said calculated rotation comprising:
determine a processed change orientation based on a determination of a size of the changed orientation with respect to at least one axis of the 3D space being less than a threshold value, wherein a size of the processed change orientation represents a weighted reduction of the size of the change in the orientation, said weighting being based on the size of the change in orientation and greater than zero (0) percent; and
orient an object displayed on a screen based on the calculated rotation associated with the hand axis adjusted by the processed change orientation; and
a position measurer to determine the first position and the second position information.

13. A method for operating an apparatus for rotating an object on a screen, the method comprising:
in an apparatus for rotating an object on a screen:
determining, via a hand axis determiner, the orientation of the orientation of a hand axis between respective points at a first hand and a second hand of a user in a real world environment, in response to a first 3D position information related to the first hand and in response to a second 3D position information related to the second hand,
detecting, via a hand axis detector, a change in the orientation of the hand axis with respect to an axis of a 3D space in the real world,
calculating, via an object rotation calculator:
a processed change orientation based on a determination of a size of change in the orientation with respect to at least one axis of the 3D space being less than a threshold value, wherein a size of the processed change orientation is based on a weighted reduction of the size of the change in the orientation, when said change in the orientation is less than said threshold value, said weighting being based on the size of the change in the orientation and greater than zero (0) percent; and
an orientation of the object on the screen based on the changed orientation of the hand axis and the processed change orientation.

14. A computer program product stored on a computer readable storage medium that is not a propagating signal or wave, the program product when communicating with an apparatus for rotating an object on a screen, is configured to control the apparatus to:
determine, via a hand axis determiner, an orientation of a hand axis between respective points at a first hand and a second hand, based on a first position information related to the first hand and a second position information related to the second hand;
detect, via a hand axis change detector, a change in the orientation of the hand axis with respect to an axis of a 3D space,
calculate, via an object rotation calculator, a rotation of the object on the screen in response to the change in the orientation, wherein the change in the orientation comprises:
determine an angular change of the change in the orientation with respect to at least one axis of the 3D space based on a comparison of a size of the change in the orientation with respect to a corresponding threshold value, wherein a size of the angular change of the change orientation is represents a weighted reduction of the size of the change in the orientation when the angular change is less than said corresponding threshold value, said weighting being based on the size of the change in the orientation and greater than zero (0) percent; and
orient the object based on the determined change in the orientation adjusted by the determined angular change.

15. The computer program product of claim 14, wherein the apparatus is controlled to:
determine, via the hand axis orientation detector processor, a first angle, a second angle, and a third angle with respect to a corresponding axis of the 3D space;
compare via the hand axis orientation detector processor, the first, the second and the third angles with respective first threshold, second threshold and third threshold;
alter at least one of the respective first angle, the second angle and third angle in response to respective first and second and third comparison results, wherein the altered one of the first angle, the second angle and the third angle reduces a corresponding angular change between the first angle and a first axis of the 3D space, the second angle and a second axis of the 3D space and a third angle and a third axis of the 3D space; and determine the processed changed orientation based on the at least one of the reduced first angle, the reduced second angle and reduced third angle, wherein a size of the processed change orientation is based on the size of the change in the orientation.

16. The computer program product of claim 14, wherein the reduction in based on one of the first angle, the second angle and the third angle being less than a corresponding threshold value.

17. The computer program product of claim 16, wherein the reduction is a weighted reduction.

18. The computer program product of claim 16, wherein the reduction tends toward zero.

19. A computer readable storage medium, that is not a propagating signal or a wave, for storing a computer program product, the computer program product configured to control an apparatus for rotating an object on a screen to:

define, via a hand axis definer, a hand axis between a first position information related to a first hand and a second position information related to a second hand, detect, via a hand axis orientation detecting processor, a changed orientation of the hand axis with respect to an axis of a 3D space, process, via a hand axis orientation detector, containing a processor, the detected changed orientation, said process comprising:

determine a processed changed orientation based on a determination of a size of said changed orientation with respect to a threshold value in at least one axis of the 3D space, wherein a size of the processed change orientation is based on a weighted reduction of the size of the change in the orientation when the changed orientation is less than said threshold value, said weighting being based on the size of the changed orientation and greater than zero (0) percent; and calculate, via an object rotation calculator, a rotation of the object on the screen in response to the processed changed orientation.

* * * * *